United States Patent
Kaji et al.

(10) Patent No.: US 11,931,927 B2
(45) Date of Patent: Mar. 19, 2024

(54) METHOD FOR PRODUCING FIBER REINFORCED PLASTIC PRODUCT, AND CORE

(71) Applicant: Mitsubishi Chemical Corporation, Tokyo (JP)

(72) Inventors: Satoshi Kaji, Tokyo (JP); Tsuneo Takano, Tokyo (JP); Takashi Honma, Tokyo (JP)

(73) Assignee: Mitsubishi Chemical Corporation, Tokyo (JP)

(*) Notice: Subject to any disclaimer, the term of this patent is extended or adjusted under 35 U.S.C. 154(b) by 236 days.

(21) Appl. No.: 17/466,338

(22) Filed: Sep. 3, 2021

(65) Prior Publication Data
US 2021/0394462 A1 Dec. 23, 2021

Related U.S. Application Data

(63) Continuation of application No. PCT/JP2020/007384, filed on Feb. 25, 2020.

(30) Foreign Application Priority Data

Mar. 8, 2019 (JP) .................................. 2019-042164

(51) Int. Cl.
*B29C 33/52* (2006.01)
*B29C 43/36* (2006.01)
(Continued)

(52) U.S. Cl.
CPC ............ *B29C 33/52* (2013.01); *B29C 43/361* (2013.01); *B29C 70/48* (2013.01);
(Continued)

(58) Field of Classification Search
CPC ... B29C 33/52; B29C 2033/525; B29C 33/54; B29C 33/76
See application file for complete search history.

(56) References Cited

U.S. PATENT DOCUMENTS 5,259,901 A * 11/1993 Davis .................... B29C 70/446
    156/154
5,614,143 A * 3/1997 Hager .................... A63B 60/00
    473/324
(Continued)

FOREIGN PATENT DOCUMENTS

CN     101844206 A    9/2010
CN     107548341 A    1/2018
(Continued)

OTHER PUBLICATIONS

Office Action issued in related Chinese Patent Application No. 202080018324.1 dated Nov. 3, 2022.
(Continued)

*Primary Examiner* — Matthew J Daniels
(74) *Attorney, Agent, or Firm* — Morgan, Lewis & Bockius LLP (57) ABSTRACT

A main object of the present invention is to provide beneficial improvements relating to a method for producing a fiber reinforced plastic product, the method including curing while pressurizing a prepreg preform by using a core having a fusible part as means for pressurizing. A method for producing a fiber reinforced plastic product, the method including: a core preparation step of preparing a core comprising a fusible part and an outer skin covering the fusible part; a molding step of disposing a prepreg preform inside a mold together with the core, and heating and pressurizing the prepreg preform in the mold to obtain a cured product; and a core removal step of removing materials of the fusible part from the cured product, in the molding step, at least a portion of the prepreg preform being pressurized by expansion of the core, in which the fusible part comprises a first fusible part and a second fusible part having a fusion temperature higher than that of the first fusible part, a material of the first fusible part and a material (Continued)

of the second fusible part are incompatible with each other, and in the molding step, the first fusible part fuses partially or entirely, while the second fusible part does not fuse partially or entirely.

23 Claims, 7 Drawing Sheets

(51) Int. Cl.
    *B29C 70/48*     (2006.01)
    *B29C 43/58*     (2006.01)
    *B29C 70/46*     (2006.01)
    *B29K 105/08*     (2006.01)
    *B29K 691/00*     (2006.01)

(52) U.S. Cl.
    CPC .............. *B29C 2043/3613* (2013.01); *B29C 2043/3668* (2013.01); *B29C 2043/5816* (2013.01); *B29C 70/46* (2013.01); *B29K 2105/0872* (2013.01); *B29K 2691/00* (2013.01); *B29K 2891/00* (2013.01)

(56) References Cited

U.S. PATENT DOCUMENTS

| | | | |
|---|---|---|---|
| 5,795,524 A * | 8/1998 | Basso, Jr. ............... | B29C 33/52 156/173 |
| 2002/0038923 A1 | 4/2002 | Lenherr | |
| 2005/0023734 A1 * | 2/2005 | Koschmieder .......... | B29C 70/54 264/513 |
| 2006/0068170 A1 | 3/2006 | Hanson | |
| 2010/0247700 A1 | 9/2010 | Hayashi et al. | |
| 2014/0361467 A1 | 12/2014 | Murai et al. | |
| 2015/0183139 A1 * | 7/2015 | Takano .................. | B29C 70/46 264/219 |
| 2017/0217127 A1 | 8/2017 | Kobayashi et al. | |
| 2018/0162074 A1 | 6/2018 | Takano et al. | |

FOREIGN PATENT DOCUMENTS

| | | |
|---|---|---|
| CN | 109318511 A | 2/2019 |
| EP | 3533580 A1 | 9/2019 |
| JP | 2008-514452 A | 5/2008 |
| JP | 2008-238566 A | 10/2008 |
| JP | 2014-237221 A | 12/2014 |
| JP | 2015-112784 A | 6/2015 |
| JP | 2016-036919 A | 3/2016 |
| WO | 2016/052645 A1 | 4/2016 |
| WO | 2018/079824 A1 | 5/2018 |

OTHER PUBLICATIONS

Notice of Reasons for Refusal issued in corresponding Japanese Patent Application No. 2018-158105 dated Jun. 14, 2022.
Extended European Search Report issued in corresponding European Patent Application No. 20770137.6 dated Mar. 22, 2022.
Office Action issued in corresponding Japanese Patent Application No. 2021-504897 dated Apr. 12, 2022.
International Search Report issued in related International Patent Application No. PCT/JP2020/007384 dated Apr. 21, 2020.

\* cited by examiner

_(1)_
METHOD FOR PRODUCING FIBER REINFORCED PLASTIC PRODUCT, AND CORE

TECHNICAL FIELD

The present invention relates to a method for producing a fiber reinforced plastic product, and a core.

The present application is a continuation application of International Application No. PCT/JP2020/007384, filed on Feb. 25, 2020, which claims priority of Japanese Patent Application No. 2019-042164, filed Mar., 8 2019, the content of which is incorporated herein by reference.

BACKGROUND ART

Fiber reinforced plastic (FRP; Fiber Reinforced Plastic) products having a hollow part, a tubular part, a U-shaped cross-section part, an undercut part, and the like are used in various applications including as a reinforcement for automobiles.

As a method for producing an FRP product having a hollow part or a U-shaped cross-section part, a method of disposing a prepreg preform in a mold together with a core comprising a wax, and curing it while pressurizing the prepreg preform by causing the core to expand inside the mold, has been proposed (Patent Document 1).

CITATION LIST

Patent Document

[Patent Document 1]
PCT International Publication No. WO 2018/079824

SUMMARY OF INVENTION

Technical Problem

A main object of the present invention is to provide beneficial improvements relating to a method for producing a fiber reinforced plastic product, the method including curing while pressurizing a prepreg preform by using a core having a fusible part as means for pressurizing.

Solution to Problem

Embodiments of the present invention include the following; however, the embodiments are not limited to these.

[1] A method for producing a fiber reinforced plastic product, the method including: a core preparation step of preparing a core comprising a fusible part and an outer skin covering the fusible part; a molding step of disposing a prepreg preform inside a mold together with the core and heating and pressurizing the prepreg preform in the mold to obtain a cured product; and a core removal step of removing materials of the fusible part from the cured product, in the molding step, at least a portion of the prepreg preform being pressurized by expansion of the core, in which the fusible part comprises a first fusible part and a second fusible part having a fusion temperature higher than that of the first fusible part, a material of the first fusible part and a material of the second fusible part are incompatible with each other, and in the molding step, the first fusible part fuses partially or entirely, while the second fusible part does not fuse partially or entirely.

[2] The method according to [1], in which in the molding step, a plate is disposed inside the mold in addition to the prepreg preform and the core, and the plate is disposed between at least a portion of the prepreg preform and the core.

[3] The method according to [1] or [2], in which a difference $T_M\text{-}T_{m1}$ between a mold temperature $T_M$ in the molding step and a fusion temperature $T_{m1}$ of the first fusible part is 20° C. or more.

[4] The method according to [1] or [2], in which a mold temperature $T_M$ in the molding step is 140° C. to 150° C., and a fusion temperature $T_{m1}$ of the first fusible part is lower than 120° C.

[5] The method according to any one of [1] to [4], in which a difference $T_M\text{-}T_{m2}$ between a mold temperature $T_M$ in the molding step and a fusion temperature $T_{m2}$ of the second fusible part is positive in value.

[6] The method according to any one of [1] to [5], in which a difference $T_{m2}\text{-}T_{m1}$ between a fusion temperature $T_{m2}$ of the second fusible part and a fusion temperature $T_{m1}$ of the first fusible part is 15° C. or more.

[7] The method according to [6], in which a difference $T_M\text{-}T_{m2}$ between a mold temperature $T_M$ in the molding step and the fusion temperature $T_{m2}$ of the second fusible part is 5° C. or less.

[8] The method according to any one of [1] to [5], in which a difference $T_{m2}\text{-}T_{m1}$ between a fusion temperature $T_{m2}$ of the second fusible part and a fusion temperature $T_{m1}$ of the first fusible part is 20° C. or more, and a difference $T_M\text{-}T_{m2}$ between a mold temperature $T_M$ in the molding step and the fusion temperature $T_{m2}$ of the second fusible part is more than 5° C.

[9] The method according to any one of [1] to [8], in which a fusion temperature $T_{m1}$ of the first fusible part is 50° C. or higher.

[10] The method according to any one of [1] to [9], in which a molding time in the molding step is 5 minutes or less.

[11] The method according to any one of [1] to [10], in which in the core preparation step, the outer skin is formed using an elastomer which may be a UV-curable elastomer.

[12] The method according to any one of [1] to [11], in which in the core removal step, the materials of the fusible part are removed by fusing the materials.

[13] The method according to [12], in which in the core removal step, the material of the first fusible part is removed at a temperature at which the material of the first fusible part fuses and the material of the second fusible part does not fuse, and then the material of the second fusible part is removed.

[14] The method according to [12], in which after the core removal step, the material of the first fusible part and the material of the second fusible part are separated by utilizing a difference of the fusion temperatures thereof.

[15] The method according to any one of [1] to [12], in which there is a specific gravity difference between a melt of the first fusible part and a melt of the second fusible part at the same temperature.

[16] The method according to [15], in which during the core removal step or after the core removal step, the material of the first fusible part and the material of the second fusible part are separated by utilizing the specific gravity difference.

[17] The method according to any one of [1] to [16], in which at least one of the first fusible part and the second fusible part comprises an organic substance.

[18] The method according to any one of [1] to [16], in which the first fusible part and the second fusible part each comprises an organic substance.

[19] The method according to any one of [1] to [16], in which the first fusible part and the second fusible part each comprises a wax.

[20] The method according to any one of [1] to [16], in which one of the first fusible part and the second fusible part comprises a wax containing a compound having a polar group as a main component, and the other comprises a wax containing a hydrocarbon as a main component.

[21] The method according to any one of [1] to [16], in which one of the first fusible part and the second fusible part comprises a wax containing one or more compounds selected from a hydroxy fatty acid amide, a fatty acid amide, and a fatty acid ester, and the other comprises a wax containing a hydrocarbon as a main component.

[22] The method according to [20] or [21], in which the first fusible part comprises the wax containing a hydrocarbon as a main component.

[23] The method according to any one of [20] to [22], in which the wax containing a hydrocarbon as a main component comprises a polyethylene wax.

[24] A method for producing a fiber reinforced plastic product, the method including: a step of disposing a prepreg preform inside a mold together with a core comprising a fusible part and an outer skin covering the fusible part, and heating and pressurizing the prepreg preform in the mold to obtain a cured product, in which the fusible part comprises a wax containing a compound having a polar group as a main component, and a wax containing a hydrocarbon as a main component.

[25] A method for producing a fiber reinforced plastic product, the method including: a step of disposing a prepreg preform inside a mold together with a core comprising a fusible part and an outer skin covering the fusible part, and heating and pressurizing the prepreg preform in the mold to obtain a cured product, in which the fusible part comprises a wax containing one or more compounds selected from a hydroxy fatty acid amide, a fatty acid amide, and a fatty acid ester, and a wax containing a hydrocarbon as a main component.

[26] The method according to [24] or [25], in which the wax containing a hydrocarbon as a main component comprises a polyethylene wax.

[27] The method according to any one of [1] to [26], in which the fiber reinforced plastic product has a structure corresponding to at least any one of a hollow part, a tubular part, a U-shaped cross-section part, or an undercut part.

[28] The method according to any one of [1] to [27], in which the fiber reinforced plastic product is a component of transportation equipment or a portion thereof.

[29] A core disposed inside a mold when a composite comprising fibers and a thermosetting resin is heated and pressurized to cure inside the mold, and used to pressurize at least a portion of the composite, the core including a fusible part and an outer skin covering the fusible part, in which the fusible part comprises a first fusible part and a second fusible part having a fusion temperature higher than that of the first fusible part, and a material of the first fusible part and a material of the second fusible part are incompatible with each other.

[30] The core according to [29], in which a fusion temperature of the first fusible part is 50° C. or higher.

[31] The core according to [29] or [30], in which a difference $T_{m2}-T_{m1}$ between a fusion temperature $T_{m2}$ of the second fusible part and a fusion temperature $T_{m1}$ of the first fusible part is 15° C. or more.

[32] The core according to any one of [29] to [31], in which the fusion temperature of the first fusible part is lower than 120° C.

[33] The core according to any one of [29] to [32], in which the fusion temperature of the second fusible part is 135° C. or higher.

[34] The core according to any one of [29] to [33], in which there is a specific gravity difference between a melt of the first fusible part and a melt of the second fusible part at the same temperature.

[35] The core according to any one of [29] to [34], in which at least one of the first fusible part and the second fusible part comprises an organic substance.

[36] The core according to any one of [29] to [34], in which the first fusible part and the second fusible part each comprises an organic substance.

[37] The core according to any one of [29] to [34], in which the first fusible part and the second fusible part each comprises a wax.

[38] The core according to any one of [29] to [34], in which one of the first fusible part and the second fusible part comprises a wax containing a compound having a polar group as a main component, and the other comprises a wax containing a hydrocarbon as a main component.

[39] The core according to any one of [29] to [34], in which one of the first fusible part and the second fusible part comprises a wax containing one or more compounds selected from a hydroxy fatty acid amide, a fatty acid amide, and a fatty acid ester, and the other comprises a wax containing a hydrocarbon as a main component.

[40] The core according to [38] or [39], in which the first fusible part comprises the wax containing a hydrocarbon as a main component.

[41] A core disposed inside a mold when a composite comprising fibers and a thermosetting resin is heated and pressurized to cure inside the mold, and used to pressurize at least a portion of the composite,
the core comprising a fusible part and an outer skin covering the fusible part,
in which the fusible part comprises a wax containing a compound having a polar group as a main component, and a wax containing a hydrocarbon as a main component.

[42] A core disposed inside a mold when a composite comprising fibers and a thermosetting resin is heated and pressurized to cure inside the mold, and used to pressurize at least a portion of the composite,
the core comprising a fusible part and an outer skin covering the fusible part,
in which the fusible part comprises a wax containing one or more compounds selected from a hydroxy fatty acid amide, a fatty acid amide, and a fatty acid ester, and a wax containing a hydrocarbon as a main component.

[43] The core according to any one of [38] to [42], in which the wax containing a hydrocarbon as a main component comprises a polyethylene wax.

[44] The core according to any one of [29] to [43], in which the outer skin comprises an elastomer.

[45] The core according to any one of [29] to [43], in which the outer comprises a UV-cured elastomer.

Advantageous Effects of Invention

Beneficial improvements relating to a method for producing a fiber reinforced plastic product, the method including curing while pressurizing a prepreg preform by using a core having a fusible part as means for pressurizing are provided.

DESCRIPTION OF EMBODIMENTS

As is well known to those ordinarily skilled in the art, a prepreg (pre-impregnated composite material) is a composite comprising fibers and a thermosetting resin, which is used as an intermediate material in the production of FRP products. An FRP product is produced by preforming a prepreg and then curing the prepreg in a mold.

The fibers in the prepreg have various forms such as long fibers to a woven fabric, a nonwoven fabric, a non-crimp fabric and short fibers. A product obtained by impregnating long fibers that are aligned in one direction in one plane with a resin, is called a unidirectional prepreg (UD prepreg), and a product obtained by impregnating a woven fabric with a resin is called a cross prepreg. A prepreg obtained by impregnating a mat comprising chopped short fibers with a resin is called SMC (sheet molding compound). A prepreg obtained by impregnating a single long fiber bundle with a resin is called a tow prepreg.

Examples of the fibers used for the prepreg include carbon fibers, glass fibers, aramid fibers, silicon carbide fibers, and metal fibers. Two or more kinds of fibers may be used in combination.

Examples of the thermosetting resin used for the prepreg include an epoxy resin, a urea resin, a vinyl ester resin, an unsaturated polyester, a polyurethane, and a phenol resin. A mixture of two or more kinds of thermosetting resins may also be used.

The content of the thermosetting resin in the prepreg is 15% to 50% by mass in many cases. The content may be 15% to 20% by mass, 20% to 25% by mass, 25% to 40% by mass, 40% to 45% by mass, or 45% to 50% by mass.

Various additives can be added to the prepreg. Examples include a flame retardant, an anti-foaming agent, a defoaming agent, a mold release agent, a particulate filler, a colorant, and a silane coupling agent.

1. Method for Producing FRP Product

An aspect of the present invention relates to a method for producing an FRP product.

Figure 1:
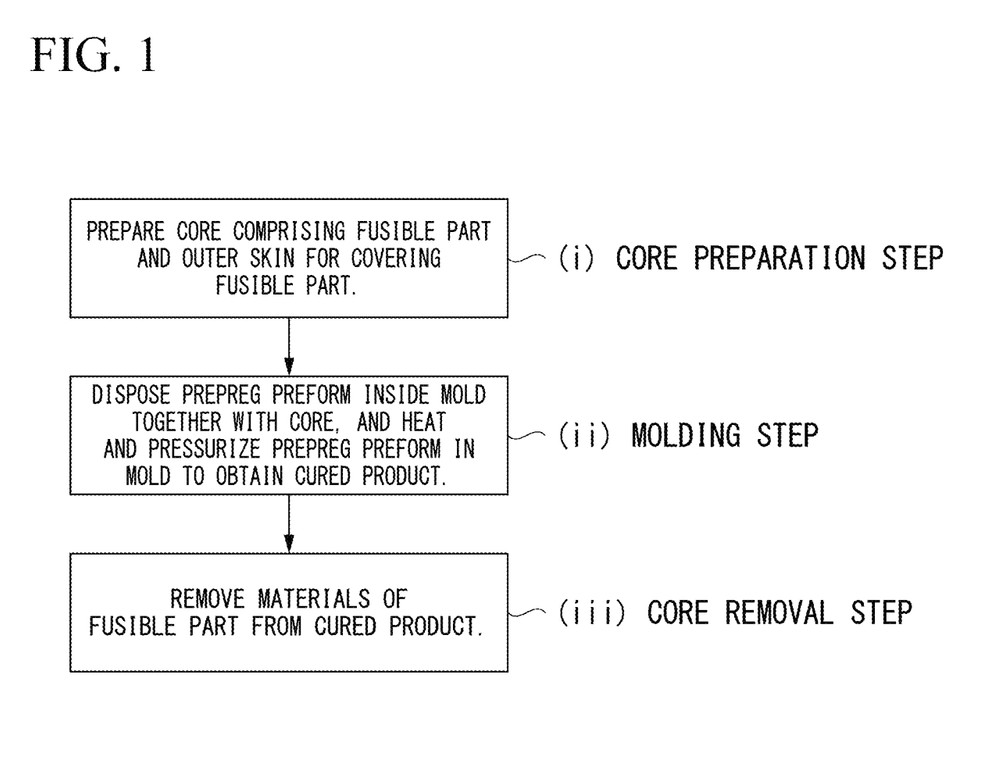
FIG. 1 is a flow chart showing a method for producing an FRP product according to embodiments of the present invention.

The method for producing an FRP product according to embodiments of the present invention has at least the following three steps as shown by the flow in FIG. 1.

(i) A core preparation step of preparing a core comprising a fusible part and an outer skin covering the fusible part.

(ii) A molding step of disposing a prepreg preform in a mold together with the core and heating and pressurizing the prepreg preform in the mold to obtain a cured product (FRP product).

(iii) A core removal step of removing the material of the fusible part from the cured product.

Hereinafter, each of the steps (i) to (iii) will be described in detail with reference to the drawings, by taking a case where a hollow cuboid article is produced as an FRP product, as an example.

(1) Core Preparation Step

Figure 2:
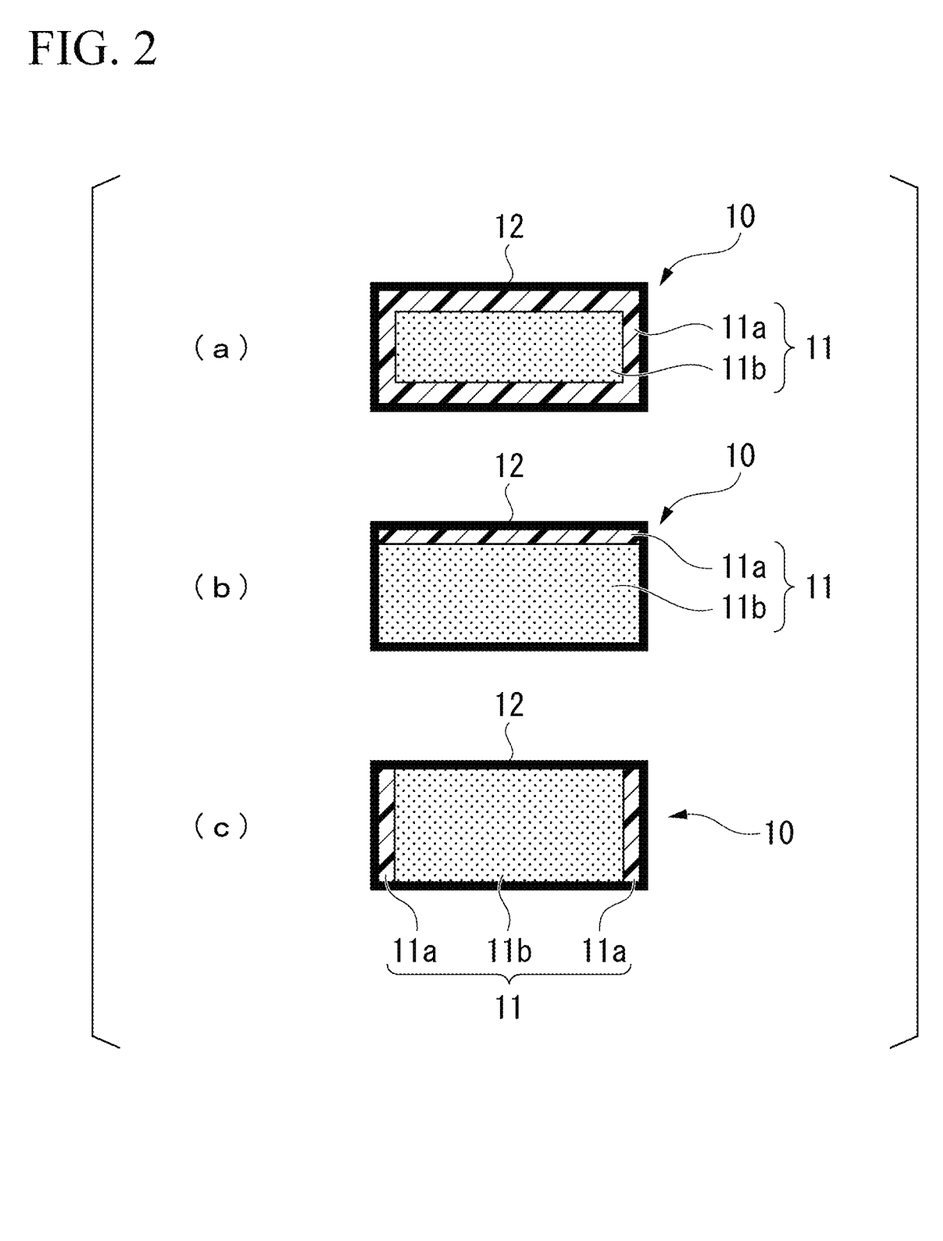
FIGS. 2(a) to 2(c) are schematic cross-sectional views each showing a structural example of a core prepared in a core preparation step.

FIG. 2 is a cross-sectional view showing the structure of the core prepared in the core preparation step.

A core 10 comprises a fusible part 11 and an outer skin 12 covering the fusible part, and the fusible part 11 further comprises a first fusible part 11a and a second fusible part 11b.

The fusion temperatures of the first fusible part 11a and the second fusible part 11b are different from each other, and the fusion temperature of the second fusible part 11b is higher than the fusion temperature of the first fusible part 11a.

A preferable fusion temperature that each of the first fusible part 11a and the second fusible part 11b should have will be described later.

The material of the first fusible part 11a and the material of the second fusible part 11b are incompatible with each other. Therefore, a melt of the first fusible part 11a does not dissolve the second fusible part 11b, and when the melt of the first fusible part 11a and a melt of the second fusible part 11b are put into one container, the two are separated into two phases.

the first fusible part 11a and the second fusible part 11b are only required to be disposed such that the first fusible part 11a is not completely surrounded by the second fusible part 11b.

For example, as shown in FIG. 2(a), the second fusible part 11b may be surrounded by the first fusible part 11a, or as shown in FIG. 2(b), the first fusible part 11a and the second fusible part 11b may be disposed adjacent to each other.

As shown in FIG. 2(c), the first fusible part 11a may be divided into a plurality of portions.

Also for the second fusible part 11b, it is not necessarily required that the second fusible part 11b is one lump, and it may comprise a plurality of pieces.

It is sufficient that the first fusible part 11a and the second fusible part 11b are in contact with each other, and it is not necessary that the first fusible part 11a and the second fusible part 11b are firmly bonded to each other.

It is preferable that the first fusible part 11a and the second fusible part 11b each comprises an organic substance, and it is particularly preferable that the first fusible part 11a and the second fusible part 11b comprises wax. Organic substances such as wax can be shaped either by machine work such as severing, cutting and polishing, or by molding, and the shape can be easily modified by machine work after shaping by molding. Forming the fusible parts with organic substances is also advantageous in reducing the weight of the fusible part 11.

The characteristic of organic substances that the thermal conductivity is low is also advantageous as a material for the fusible part 11.

The wax that can be used as the material of the fusible part 11 is not limited, and examples include petroleum waxes such as paraffin wax and microcrystalline wax; synthetic waxes such as Fisher Tropsch wax, polyethylene wax, polypropylene wax, fatty acid amide wax, hydroxy fatty acid amide wax, and fatty acid ester wax; waxes such as oxidized paraffin wax and oxidized polyolefin wax obtained by chemically modifying a petroleum wax and a synthetic wax; waxes obtained by blending synthetic resins with these waxes; and waxes obtained by blending different kinds of waxes.

According to an investigation conducted by the inventors of the present invention, a hydroxy fatty acid amide wax, a fatty acid amide wax, and a fatty acid ester wax, which are waxes including compounds having polar groups as main components, did not show compatibility with polyethylene wax; however, a hydroxy fatty acid amide wax and a fatty acid amide wax were compatible with each other.

From this, when both the first fusible part 11a and the second fusible part 11b are formed from waxes, it is preferable that either of them is formed with a wax containing one or more compounds selected from a hydroxy fatty acid amide, a fatty acid amide, and a fatty acid ester, and the other is formed with a wax containing a hydrocarbon as a main component, such as polyethylene wax, petroleum wax, Fisher Tropsch wax, or polypropylene wax, especially polyethylene wax.

One of the first fusible part 11a and the second fusible part 11b may be formed with an organic substance, and the other may be formed with a fusible alloy such as Wood's alloy, Rose's alloy, Lipowitz's alloy, or Newton's alloy.

In order to prevent the outer skin 12 from breaking when the core 10 expands in the subsequent molding step, the material of the outer skin 12 should be capable of extensional deformation. This extensional deformation may be elastic or plastic, or may have both of the characteristics.

Therefore, a preferred material for the outer skin 12 is a synthetic polymer such as a polyolefin, a polyamide, a polyester, a polyurethane, or a silicone, and is more preferably an elastomer comprising these polymers.

When producing the core 10, for example, a first wax piece prepared for the first fusible part 11a and a second wax piece prepared for the second fusible part 11b are wrapped with a polymer film prepared for the outer skin 12 and sealed by adhesion or fusion. Here, the first wax piece and the second wax piece are preliminarily shaped so that as little space as possible is formed between the core to be produced and the prepreg preform to be produced in a subsequent step.

The outer skin 12 can also be formed by using a shrink tube comprising the above-described polymer. A shrink tube in which a wax piece for the fusible part has been put in may be caused to heat-shrink, and both ends of the shrink tube may be heat-sealed.

The outer skin can also be formed by using a low-temperature curable liquid rubber comprising the above-described polymer. A liquid rubber may be applied on the surface of the wax for the fusible part and cured at a temperature at which the wax does not fuse. In a modified method, a liquid rubber is applied on the surface of the wax for the fusible part, subsequently a nonwoven fabric made of a synthetic resin and capable of extensional deformation is attached to the coated face as a reinforcement, the liquid rubber is further applied on the nonwoven fabric, and then the liquid rubber may be cured.

The outer skin 12 can also be formed from a UV-curable elastomer. A UV-curable elastomer is a UV-curable resin whose cured product is an elastic body like a rubber, and an example thereof is a UV-curable silicone rubber or a UV-curable urethane acrylate. The UV-curable elastomer is suitable as the material for the outer skin 12 from the viewpoint that the UV-curable elastomer can be cured in a short period of time even at room temperature.

(2) Molding Step

Figure 3:
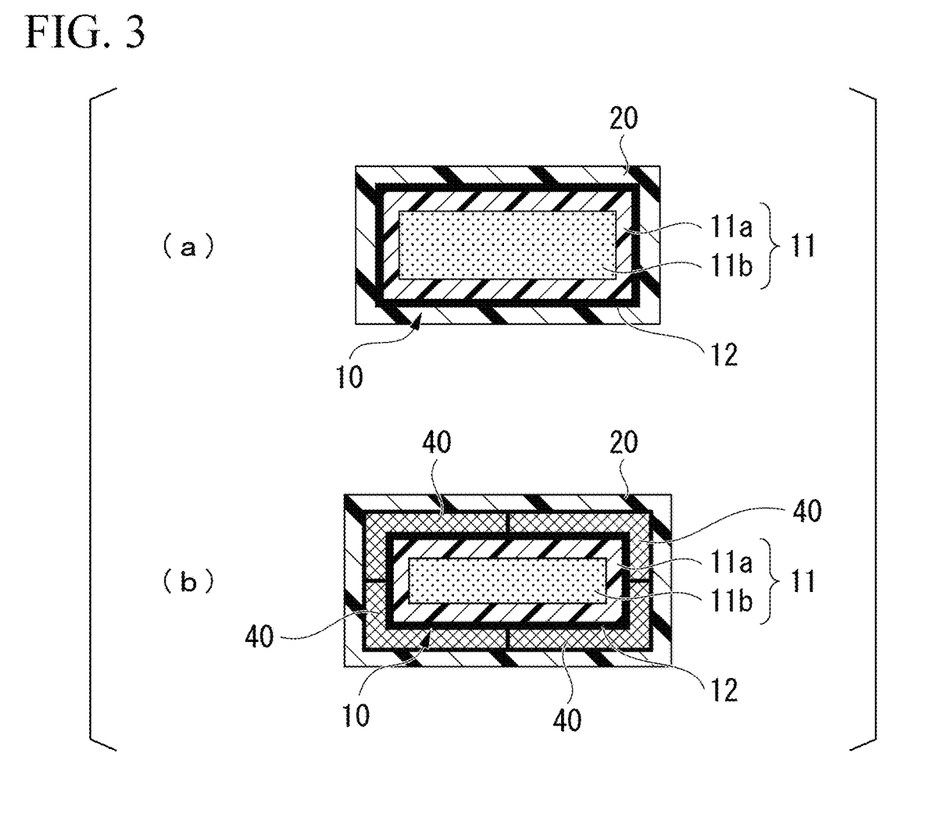
FIGS. 3(a) and 3(b) are schematic cross-sectional views each showing that a prepreg preform having a near net shape is disposed so as to surround the core.

In the molding step, first, a prepreg preform 20 having a near net shape is produced from one sheet or two or more sheets of prepreg sheets, and this is disposed around a core 10 as shown in FIG. 3(a). In an example, rather than producing the prepreg preform 20 and then combining it with the core 10, the prepreg preform 20 may be produced so as to be in a state of enclosing the core 10 from the beginning, that is, to be in the state as shown in FIG. 3(a).

As shown in FIG. 3(b), a plate 40 may be interposed between the core 10 and the prepreg preform 20. The plate 40 is bent according to the shape of the FRP product to be produced; however, instead of that, flat plates may be used in combination. Since the plate 40 needs to be substantially non-deformable in the molding step, the plate 40 is formed with a metal (including an alloy), a ceramic, or a heat-resistant hard resin, and is preferably formed from a metal. Suitable examples of the metal include, but are not limited to, stainless steel and aluminum.

Figure 4:
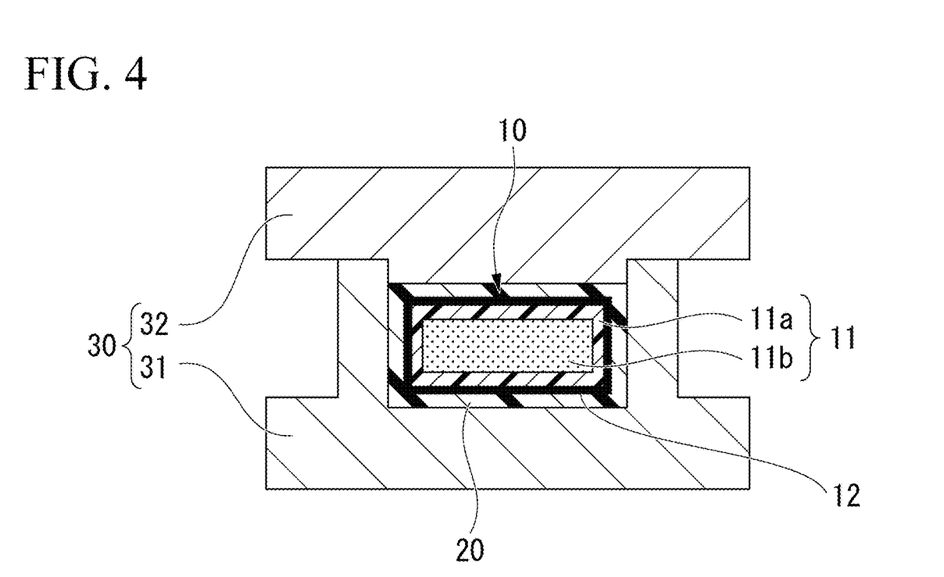
FIG. 4 is a schematic cross-sectional view showing a prepreg preform disposed inside a mold cavity together with a core.

After producing the prepreg preform 20, as shown in FIG. 4, the prepreg preform 20 is disposed in a cavity of a mold 30 comprising a lower mold 31 and an upper mold 32, together with the core 10. At this time, it is preferable that the mold 30 is preheated.

Next, the mold 30 is clamped and heated at the same time, and the prepreg preform 20 is cured. The temperature of the mold 30 is preferably 110° C. or higher; however, the temperature is not limited.

Upon heating, the core 10 expands, and the prepreg preform 20 is pressed against the inner surface of the mold 30. In other words, an internal pressure is generated because the volume of the core 10 tries to increase against the clamping force of the mold 30, and the internal pressure is applied to the prepreg preform 20.

For a short while after the start of heating, since the volume of the core 10 increases only gradually due to thermal expansion, the pressure applied to the prepreg preform 20 is weak; however, when the temperature near the surface of the core 10 reaches the fusion temperature of the first fusible part 11a, and the first fusible part 11a begins to fuse, the pressure applied to the prepreg preform 20 rises sharply. This is because a volume increase accompanied by fusion is large.

A space between the core 10 and the prepreg preform 20 and a space between the prepreg preform 20 and the mold 30, which could exist at the time point where the core 10 and the prepreg preform 20 were disposed inside the mold 30, disappear as the core 10 expands.

When the fusible part 11 forming the central portion of the core 10 comprises an organic substance, the heat transferred from the mold 30 tends to accumulate near the surface of the core 10 due to the low thermal conductivity of the organic substance.

This gives preferable results of promoting the fusion of the first fusible part 11a.

Since there is no directionality in the expansion of the core 10, all portions of the prepreg preform 20 are sufficiently pressurized between the core 10 and the mold 30.

Even when the structure shown in FIG. 2(b) or 2(c) is used as the core 10, results similar to those obtained when the core 10 of FIG. 2(a) is used are obtained. This is because the melt of the first fusible part 11a flows to penetrate between the second fusible part 11b and the outer skin 12.

When the plate 40 is interposed between the core 10 and the prepreg preform 20 as in the case of the example of FIG. 3(b), since the prepreg preform 20 is uniformly pressurized, the uniformity of the thickness and quality of the cured product is improved.

In order to pressurize the prepreg preform 20 by utilizing the large expansion of the core 10 caused by fusion of the first fusible part 11a, the fusion temperature $T_{m1}$ of the first fusible part 11a (fusion temperature of the fusible material forming the first fusible part) is required to be lower than the temperature $T_M$ of the mold 30 at the time of molding.

In order to shorten the molding time by rapidly fusing the first fusible part 11a, the difference $T_M\text{-}T_{m1}$ between the mold temperature $T_M$ at the time of molding and the fusion temperature $T_{m1}$ of the first fusible part 11a is preferably 20° C. or more, more preferably 30° C. or more, and even more preferably 50° C. or more, and may also be 60° C. or more or 70° C. or more.

For example, when the molding time is suppressed to be 5 minutes or less by setting the temperature of the mold 30 to a relatively high temperature such as 140° C. to 150° C., the fusion temperature $T_{m1}$ of the first fusible part 11a is preferably lower than 120° C., more preferably lower than 110° C., and even more preferably lower than 90° C.

The fusion temperature $T_{m1}$ of the first fusible part 11a of the core 10 is only required to be higher than room temperature (usually 25° C.) and is preferably 50° C. or higher.

The second fusible part 11b of the core 10 does not fuse entirely in the molding step and does not have to fuse at all.

When the second fusible part 11b of the core 10 does not substantially fuse in the molding step, the scale of expansion of the core 10 in the same step is determined by the volume of the first fusible part 11a. That is, when the second fusible part 11b is not caused to substantially fuse, the pressure applied to the prepreg preform 20 can be controlled by regulating the volume of the first fusible part 11a.

In order not to cause the second fusible part 11b to substantially fuse in the molding step, it is effective to make the difference $T_M\text{-}T_{m2}$ between the temperature $T_M$ of the mold 30 at the time of molding and the fusion temperature $T_{m2}$ of the second fusible part 11b small (the difference $T_M\text{-}T_{m2}$ may be negative in value), and to make the difference $T_{m2}\text{-}T_{m1}$ between the fusion temperature $T_{m2}$ of the second fusible part 11b and the fusion temperature $T_{m1}$ of the first fusible part 11a large.

For example, when the difference $T_{m2}\text{-}T_{m1}$ between the fusion temperature $T_{m2}$ of the second fusible part 11b and the fusion temperature $T_{m1}$ of the first fusible part 11a is sufficiently large, even if the fusion temperature $T_{m2}$ of the second fusible part 11b is lower than the mold temperature $T_M$ (that is, even when $T_M\text{-}T_{m2}$ is positive in value), substantial fusion of the second fusible part 11b in the molding step can be suppressed, and therefore, the range of selection regarding the material of the second fusible part 11b is widened.

From the experiments (will be described later) conducted by the present inventors, it was found that if the difference $T_{m2}\text{-}T_{m1}$ between the fusion temperature of the second fusible part 11b and the fusion temperature of the first fusible part 11a is 17° C. or more, when the difference $T_M\text{-}T_{m2}$ between the temperature $T_M$ of the mold 30 at the time of molding and the fusion temperature $T_{m2}$ of the second fusible part 11b is 5° C. or less, the second fusible part 11b hardly fuses within the molding time of 5 minutes adopted in the experiment.

Therefore, the difference $T_{m2}\text{-}T_{m1}$ between the fusion temperature $T_{m2}$ of the second fusible part 11b and the fusion temperature $T_{m1}$ of the first fusible part 11a is preferably 15° C. or more, more preferably 25° C. or more, and even more preferably 35° C. or more, and may be even 45° C. or more.

When the difference $T_{m2}\text{-}T_{m1}$ between the fusion temperature of the second fusible part 11b and the fusion temperature of the first fusible part 11a is 20° C. or more, the difference $T_M\text{-}T_{m2}$ between the temperature $T_M$ of the mold 30 at the time of molding and the fusion temperature $T_{m2}$ of the second fusible part 11b may be more than 5° C.

Figure 5:
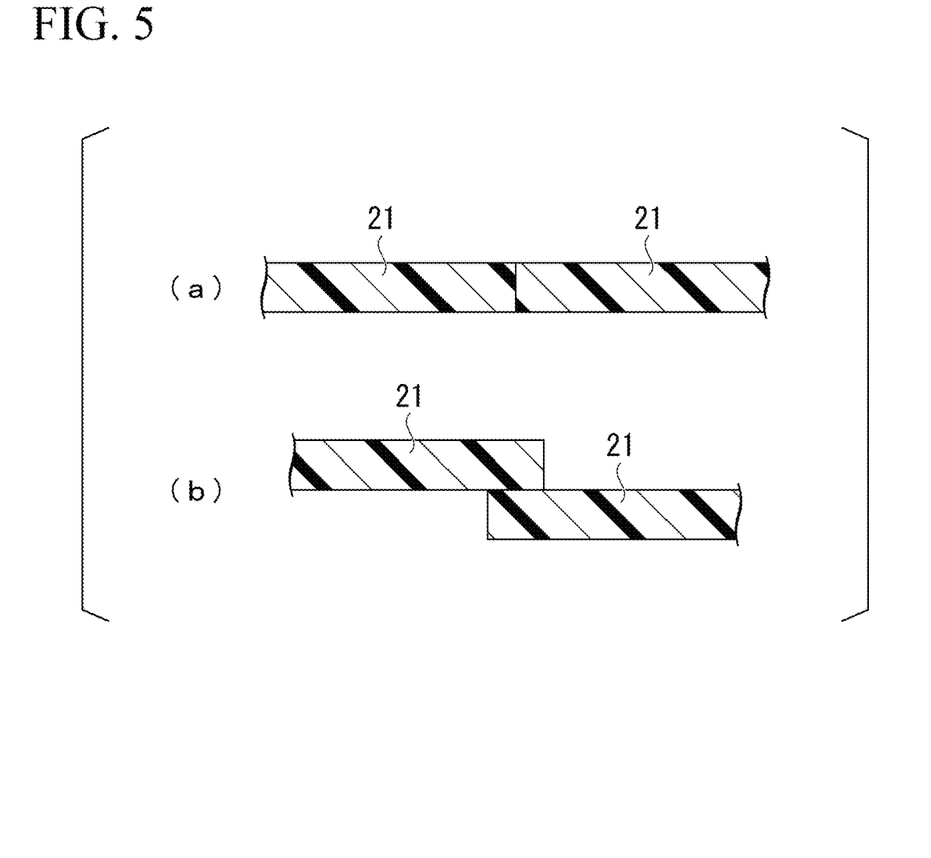
FIG. 5(a) is a schematic cross-sectional view showing a butt joint part between edge parts of prepreg sheets.
FIG. 5(b) is a schematic cross-sectional view representing an overlapping joint part between edge parts of prepreg sheets.

Since the prepreg preform 20 is made of one sheet or two or more sheets of prepreg sheets, the prepreg preform 20 has at least any one of a butt joint part between the edge parts of the prepreg sheets 21 as shown in FIG. 5(a) and an overlapping joint part between the edge parts of the prepreg sheets 21 as shown in FIG. 5(b).

In the molding step, as a gap between the edge parts of the prepreg sheets 21 at such a joint part is sealed by the outer skin 12 of the core 10, the melt of the fusible part 11 of the core 10 is prevented from penetrating between the prepreg preform 20 and the mold 30 through such a gap. The outer skin 12 can thus act as a seal because it comprises a flexible and deformable material.

As in the case of the example shown in FIG. 3(b), in the embodiment in which plates 40 are interposed between the core 10 and the prepreg preform 20, a gap between the plates 40 or a gap between the prepreg preform 20 and the plates 40 is sealed by the outer skin 12 of the core.

(3) Core Removal Step

After completion of the molding step, the FRP product obtained by curing the prepreg preform 20 is taken out from the mold 30, and the material of the core 10 filling the internal cavity is removed.

It is mainly the material of the fusible part 11 that is removed. The outer skin 12 does not need to be removed as long as it is firmly adhered to the inner surface of the FRP product and does not affect the function and appearance of the FRP product.

The fusible part 11 of the core 10 can be fused by, for example, heating in an oven, and can be discharged through a discharge hole that has been provided in advance in the FRP product using a drill or a hole saw. Heating is performed such that the temperature of the FRP product does not exceed the thermal deformation temperature.

In order to be able to quickly remove the fusible part 11 of the core 10 by this method, it is preferable that the fusion temperature of the second fusible part 11b is lower by 20° C. or more than the thermal deformation temperature (deflection temperature under load) of the FRP product.

The discharge may be promoted by providing an air blow hole in the FRP product in addition to the discharge hole and performing air blow.

In another embodiment, when producing an FRP product that is not hollow and has no undercut, it is not always necessary to fuse the fusible part in order to remove the core.

Since the material of the first fusible part 11a and the material of the second fusible part 11b are incompatible with each other, the materials can be separated by utilizing the difference in the fusion temperature and then reused.

Separation can be performed after removing the materials of the first fusible part 11a and the second fusible part 11b from the FRP product.

In one example, initially, the material of the first fusible part 11a is discharged from the FRP product by heating the FRP product to a temperature at which only the material of the first fusible part 11a fuses, and then the material of the second fusible part 11b may be discharged from the FRP product by heating the FRP product to the fusion temperature of the second fusible part 11b or higher and fusing the material of the second fusible part 11b.

When the specific gravities of the melt of the first fusible part 11a and the melt of the second fusible part 11b are different at the same temperature, the material of the first fusible part 11a and the material of the second fusible part 11b may be separated by utilizing the specific gravity difference.

As above, each step of the method for producing an FRP product according to the embodiments has been described above by taking the case of producing a hollow cuboid as an FRP product as an example; however, the production method can be used for the production of not only the hollow cuboid but also FRP products of various forms.

For example, when a prepreg preform shaped into a square tube shape is disposed around the core shown in any one of FIGS. 2(a) to 2(c) and cured, an FRP square tube can be produced.

Alternatively, when a prepreg preform shaped into a U-shaped cross-section is disposed around the core shown in any one of FIGS. 2(a) to 2(c) and cured, an FRP product having a U-shaped cross-section can be produced.

Figure 6:
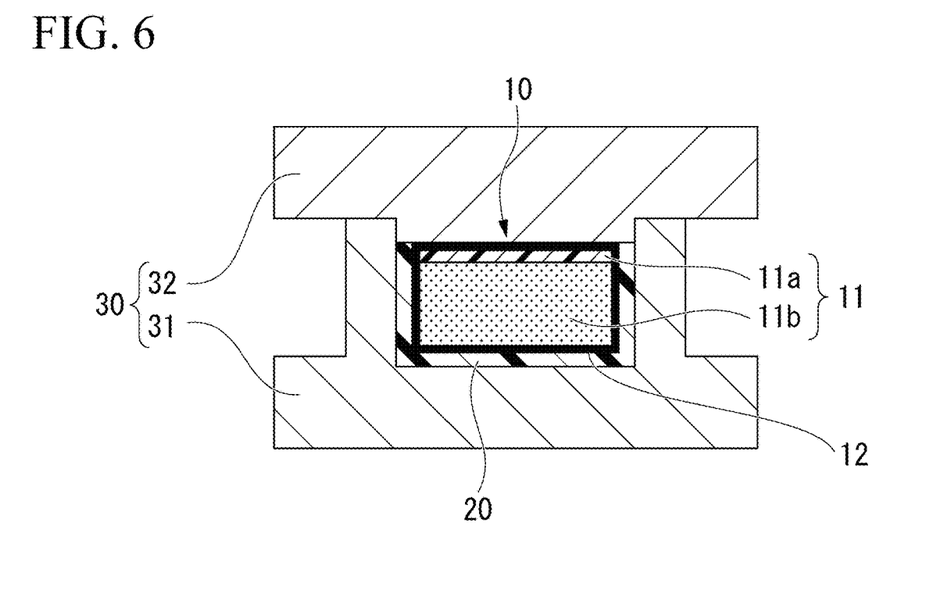
FIG. 6 is a schematic cross-sectional view showing that a prepreg preform having a U-shaped cross-section is disposed in a mold together with a core.

FIG. 6 shows, as an example, that a prepreg preform 20 having a U-shaped cross-section is disposed in a mold 30. In the molding step, the outer skin 12 of the core 10 acts as a seal, and the melt of the fusible part 11 of the core 10 is prevented from penetrating between the prepreg preform 20 and the mold 30.

Figure 7:
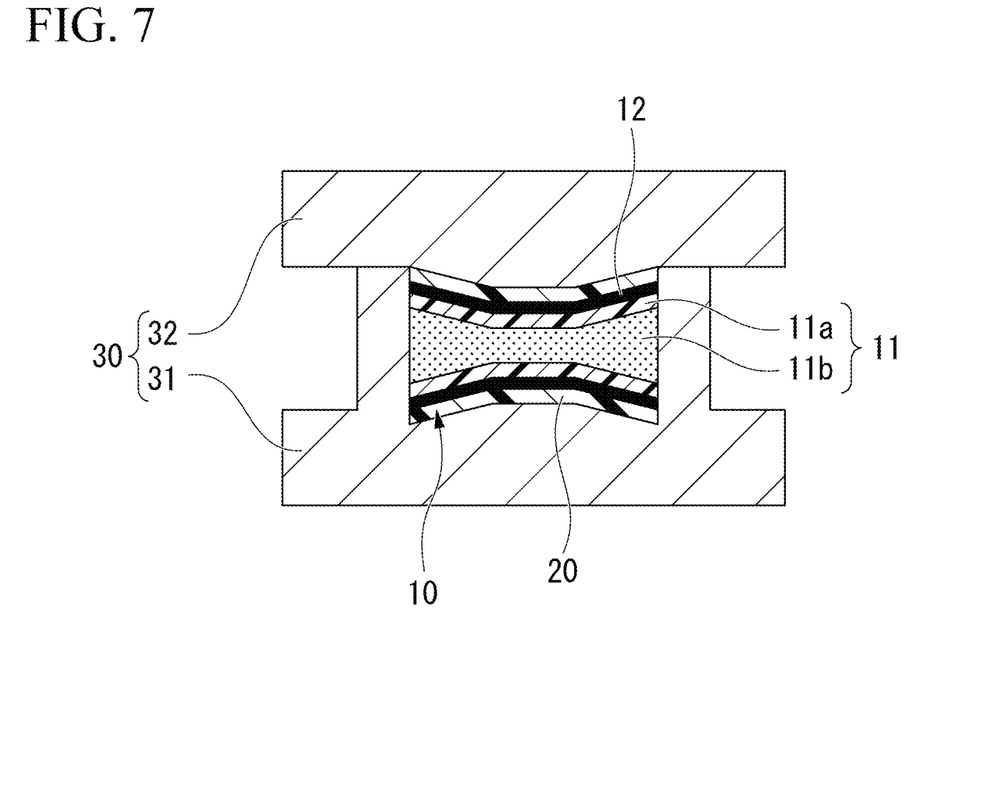
FIG. 7 is a schematic cross-sectional view showing that a prepreg preform shaped into a near net shape is disposed in a mold together with a core in order to make a cylindrical-shaped FRP product having a constriction at the center in a central axis direction.

The production method according to the embodiments can also be preferably applied to the production of an FRP product having an undercut part. FIG. 7 shows, as an example, that a prepreg preform 20 shaped into a near net shape is disposed in a mold 30 together with a core 10 in order to produce a cylindrical-shaped FRP product having a constriction at the center in a central axis direction.

Figure 8:
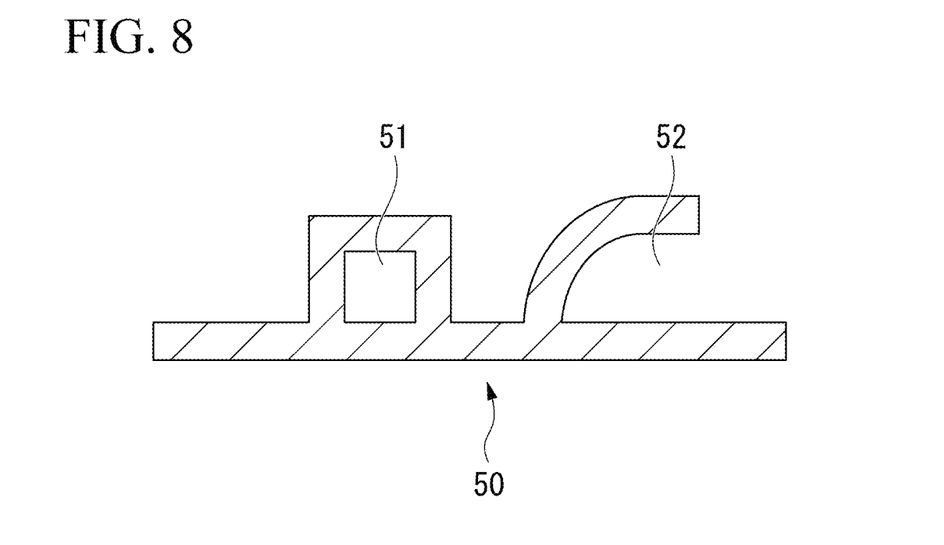
FIG. 8 is a schematic cross-sectional view showing an FRP product partially having a hollow (or tubular) part and a U-shaped cross-section part.

In addition, the production method according to the present invention can also be applied to the production of an FRP product 50 partially having a hollow (or tubular) part 51 or a U-shaped cross-section part 52 as shown in FIG. 8.

2. Core

An aspect of the present invention relates to a core used in a production of an FRP product.

A core provided in the present invention is a core that is disposed inside a mold when a composite comprising a thermosetting resin and fibers is heated and pressurized to cure inside the mold, and is used to pressurize at least a portion of the composite, the core including a fusible part and an outer skin covering the fusible part, in which the fusible part comprises a first fusible part and a second fusible part having a fusion temperature higher than that of the first fusible part, and a material of the first fusible part and a material of the second fusible part are incompatible with each other.

The core according to the embodiments can be preferably used in, for example, the method for producing an FRP product described above in section 1. The cores illustrated above in section 1. all corresponds to the embodiments of the core according to the present invention.

The core according to the embodiments can also be used in producing an FRP product by a resin transfer molding (RTM) method.

In the RTM method, not a prepreg preform but a preform of a dry fiber substrate (fabric or nonwoven fabric) that is not impregnated with a thermosetting resin is disposed in a mold, the preform is impregnated with a thermosetting resin inside the mold and then heated and compressed, and thereby a cured product (FRP product) is obtained.

In the RTM method, after the core according to the embodiments is disposed in a mold together with a preform of a fiber substrate, steps of impregnating and curing are carried out.

In the RTM method, the curing time is set to be longer compared to a molding method using a prepreg. Therefore, when the fusion temperature of the second fusible part is too low, the second fusible part of the core entirely fuses during molding. Therefore, it is preferable that the fusion temperature of the second fusible part is higher than the curing temperature.

The core according to the embodiments can also be used in molding an FRP product in which a laminate of a resin and a fiber substrate is used as an intermediate material.

3. Experimental Results

The following are the results of experiments conducted by the present inventors.

3.1. Experiment 1

Figure 9:
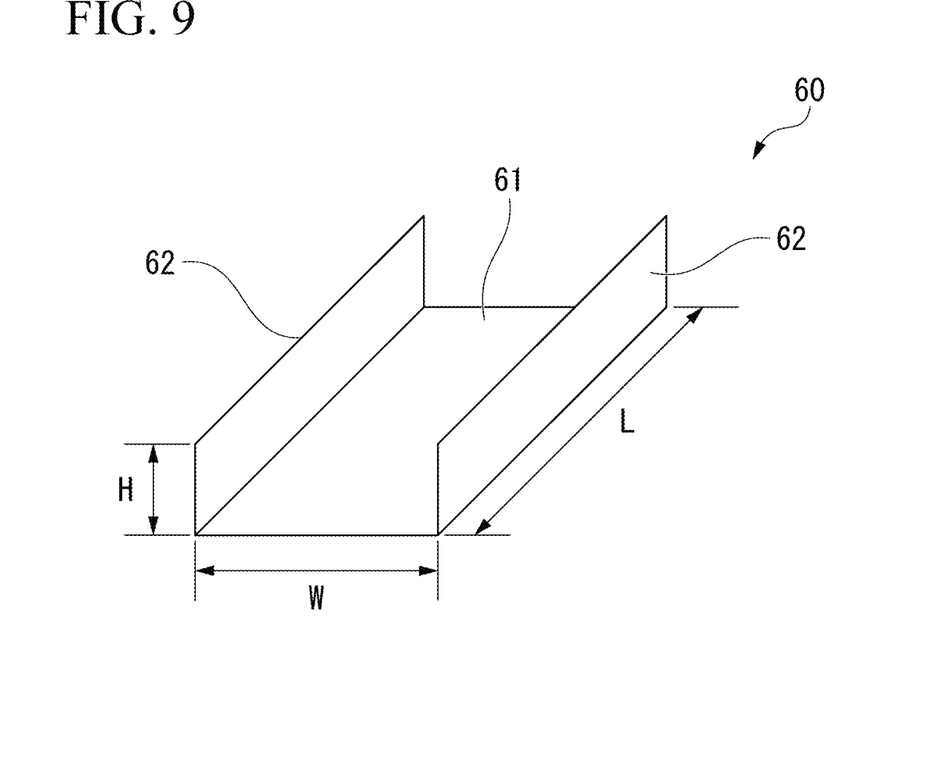
FIG. 9 is a perspective view schematically showing the external appearance of an FRP article prototyped in an experiment, the FRP article having a U-shaped cross-section and comprising a bottom face and two side faces.

As shown in FIG. 9, an FRP article 60 having a U-shaped cross-section having a length L, a width W, and a height H and comprising a rectangular bottom face 61, and side faces 62 and 62 perpendicular to the bottom face 61, provided on both sides along the longitudinal direction of the bottom face 61, was experimentally produced.

(1) Preparation of Core

A core having a structure in which a fusible part comprising a first fusible part and a second fusible part, each comprises a wax, was sealed by wrapping with an outer skin, was produced.

As the wax for the first fusible part (hereinafter referred to as "first wax"), Ferris File-A-Wax Green (melting point 117° C.) manufactured by Freeman Manufacturing & Supply Company was used. According to Published Japanese Translation No. 2015-511333 of the PCT International Publication, this product is a wax including polyethylene as a main component.

As the wax for the second fusible part (hereinafter, referred to as "second wax"), ITOHWAX J-630 (melting point 135° C.) manufactured by Itoh Oil Chemicals Co., Ltd. was used. According to the website of Itoh Oil Chemicals Co., Ltd. (http://www.itoh-oilchem.co.jp/product/pdct02.html), this product is a hydroxy fatty acid amide wax including N,N'-hexamethylene-bis-12-hydroxystearylamide as a main component.

A film having a thickness of 50 μm made of nylon 6 and having a melting point of 204° C. was used as the outer skin.

The first fusible part was constructed by using two plates each having a size of 295 mm×88 mm×4 mm and two plates each having a size of 295 mm×29 mm×4 mm, all produced by casting using the first wax.

The second fusible part was molded to be a cuboid having a size of 295 mm (length)×88 mm (width)×21 mm (height) by casting using the second wax.

Of the four plates made with the first wax, two were disposed so as to sandwich the second fusible part from both sides, and the other two were disposed so as to sandwich the second fusible part from above and below, so that the first fusible part surrounds the second fusible part, as shown in FIG. 2(a), in the cross-section perpendicular to the longitudinal direction.

Sealing of the fusible part with the outer skin was achieved by heat-fusing a nylon 6 film.

The completed core was a cuboid having a size of approximately 295 mm (length)×96 mm (width)×29 mm (height).

(2) Molding

A prepreg preform having a near net shape and having a size of 295 mm (length)×98 mm (width)×30 mm (height) was produced by stacking 5 plies of a cross prepreg having a thickness of 0.2 mm and shaping the cross prepregs at room temperature. The cross prepreg used was TR3110 360GMP (resin content 40 wt %) manufactured by Mitsubishi Chemical Corporation, which is a product obtained by impregnating a woven fabric comprising carbon fibers with an epoxy resin.

This prepreg preform was placed in a mold preliminarily heated to 140° C., together with the core prepared in the section (1). The size of the mold cavity was 300 mm (length)×100 mm (width)×30 mm (height). Next, the mold was clamped, and the prepreg preform was heated and pressurized to cure inside the mold. The mold temperature during molding was controlled to be 140° C., the molding time was set to 5 minutes. The molding time as used herein is the time taken from mold clamping to mold opening. The FRP article thus obtained had a width W of 100 mm and a height H of 29 mm and had a shape conforming to the mold, and the external appearance was favorable.

Figure 10:
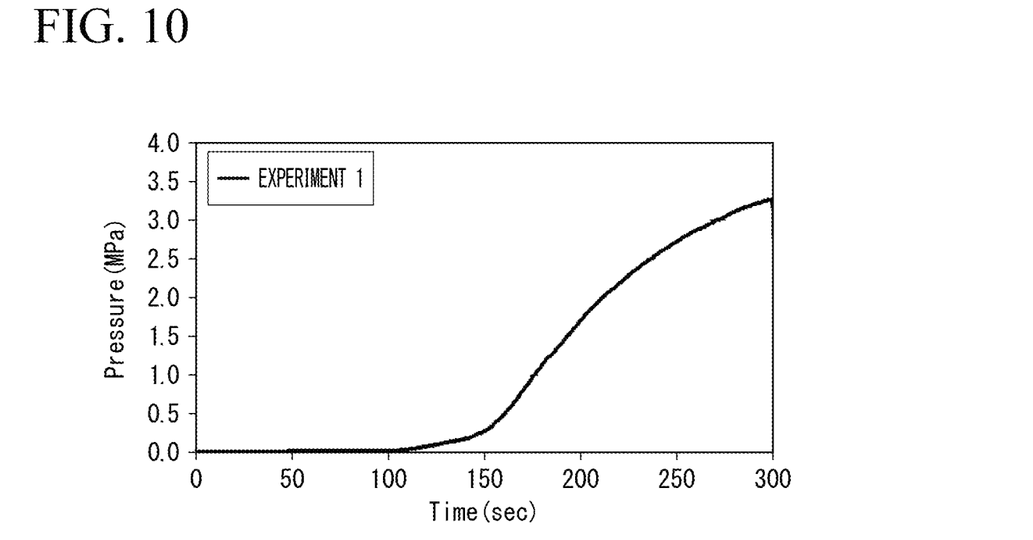
FIG. 10 is a graph showing how the pressure inside the mold changed with time in a molding step (Experiment 1).

FIG. 10 shows the results of monitoring how the pressure inside the mold changed with time in the molding step, using a piezoelectric pressure sensor installed on a side face of the cavity. As shown in the graph, the pressure inside the mold did not exceed 4 MPa.

When an observation was made after completion of the molding step, there was trace that the first wax partially fused, whereas there was almost no trace that the second wax fused.

When the fusible part of the core was caused to completely fuse, the first wax and the second wax were incompatible with each other, and the melts of these two waxes were separated into an upper layer and a lower layer, with the interface being interposed therebetween, due to the specific gravity difference between the melts.

[Experiment 2]

An FRP article having a U-shaped cross-section was experimentally produced in the same manner as in Experiment 1, except that the first wax was changed to SANWAX 151P (melting point 107° C.) manufactured by Sanyo Chemical Industries, Ltd. According to the website of Sanyo Chemical Industries, Ltd. (https://www.sanyo-chemical-.co.jp/magazine/archives/262), SANWAX 151P is a polyethylene wax including a low-molecular weight polyethylene as a main component. The appearance of the FRP article thus obtained was favorable.

Figure 11:
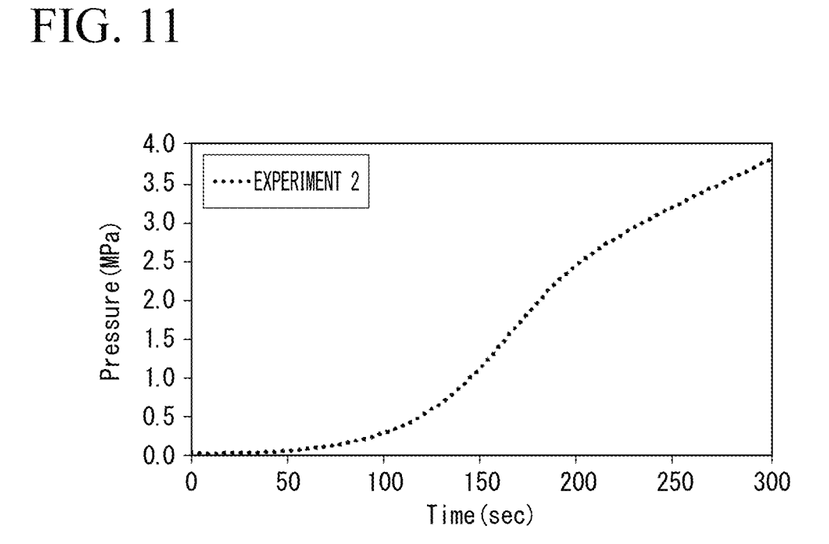
FIG. 11 is a graph showing how the pressure inside the mold changed with time in the molding step (Experiment 2).

As a result of monitoring how the pressure inside the mold changed with time during the molding step, in the same manner as in Experiment 1, the pressure inside the mold did not exceed 4 MPa, as shown in FIG. 11.

When an observation was made after completion of the molding step, there was trace that the first wax partially fused, whereas there was almost no trace that the second wax fused.

[Experiment 3]

An FRP article having a U-shaped cross-section was experimentally produced in the same manner as in Experiment 1, except that the fusible part of the core was formed only with the first wax.

Figure 12:
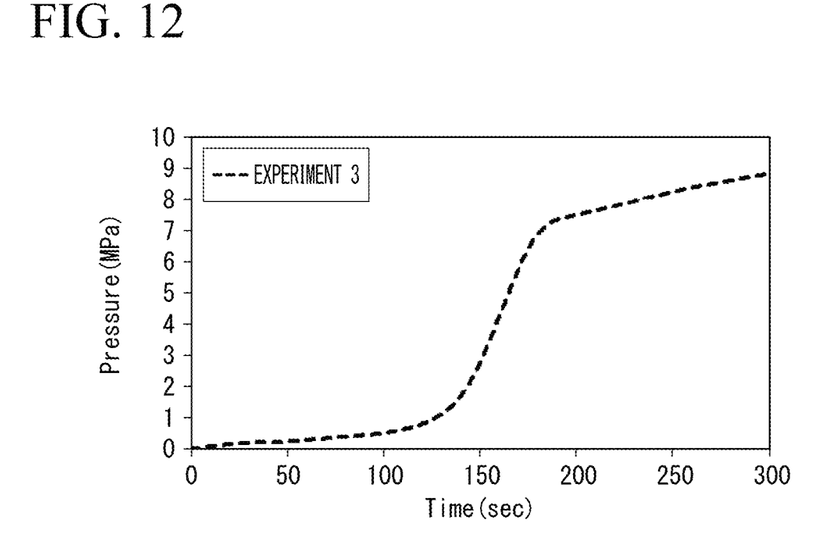
FIG. 12 is a graph showing how the pressure inside the mold changed with time in the molding step (Experiment 3).

FIG. 12 shows the results of monitoring how the pressure inside the mold changed with time during the molding step, in the same manner as in Experiment 1. As shown in the graph, the pressure inside the mold rose sharply to about 7 MPa and then showed a turn into a gradual rise. The reason why the pressure rising rate changed so abruptly is that, due to continuous expansion of the core, the pressure inside the mold exceeded the clamping force and the mold opened.

At the surface of the FRP article thus obtained, the fibers were partially disordered, and it could not be said that the appearance was favorable.

4. Other inventions

Those ordinarily skilled in the art will appreciate that the following inventions are also disclosed herein.

[A1] A method for producing a fiber reinforced plastic product, the method including a core preparation step of preparing a core comprising a fusible part and an outer skin covering the fusible part; a molding step of disposing a prepreg preform in a mold together with the core, and heating and pressurizing the prepreg preform in the mold to obtain a cured product; and a core removal step of removing materials of the fusible part from the cured product, in which in the molding step, a plate is disposed between at least a portion of the prepreg preform and the core, and at least a portion of the prepreg preform is pressurized by expansion of the core.

[A2] The method according to [A1], in which the plate comprises a material selected from a metal, a ceramic, and a heat-resistant hard resin.

[A3] The method according to [A1], in which the plate comprises a metal.

[A4] The method according to [A3], in which the metal is stainless steel or aluminum.

[A5] The method according to any one of [A1] to [A4], in which the fusible part comprises an organic substance.

[A6] The method according to any one of [A1] to [A4], in which the fusible part comprises a wax.

[A7] The method according to any one of [A1] to [A6], in which at least a portion of the fusible part fuses in the molding step.

[A8] The method according to [A7], in which only a portion of the fusible part fuses in the molding step.

[A9] The method according to any one of [A1] to [A8], in which the outer skin is an elastomer.

[A10] The method according to any one of [A1] to [A9], in which the outer skin is formed with a UV-curable elastomer in the core preparation step. [B1] A method for producing a fiber reinforced plastic product, the method including a core preparation step of preparing a core comprising a fusible part and an outer skin covering the fusible part; a molding step of disposing a prepreg preform in a mold together with the core, and heating and pressurizing the prepreg preform in the mold to obtain a cured product; and a core removal step of removing materials of the fusible part from the cured product, in which in the molding step, at least a portion of the prepreg preform is pressurized by expansion of the core, and in the core preparation step, the outer skin is formed with a UV-curable elastomer.

[B2] The method according to [B1], in which the fusible part comprises an organic substance.

[B3] The method according to [B1], in which the fusible part comprises a wax.

[B4] The method according to any one of [B1] to [B3], in which at least a portion of the fusible part fuses in the molding step.

[B5] The method according to [B4], in which only a portion of the fusible part fuses in the molding step.

[B6] A method for producing a core that is disposed inside a mold when a composite comprising fibers and a thermosetting resin is heated and pressurized to cure inside the mold, and is used to pressurize at least a portion of the composite, in which the core comprises a fusible part and an outer skin covering the fusible part, and the outer skin is formed with a UV-curable elastomer.

[B7] The method for producing a core according to [B6], in which the fusible part comprises an organic substance.

[B8] The method for producing a core according to [B6], in which the fusible part comprises a wax.

The present invention has been described above with reference to specific embodiments; however, the various embodiments have been suggested as examples and are not intended to limit the scope of the present invention. Each of the embodiments described in the present specification can be variously modified to the extent that the gist of the invention is maintained, and can be combined with the features described by other embodiments, to the extent practicable.

INDUSTRIAL APPLICABILITY

The inventions disclosed herein can be preferably used, without any limitations, when manufacturing, for example, component (including structural components) for automobiles, ships, railway vehicles, aircraft and other transportation equipment, as well as various sports goods including bicycle frames, tennis rackets, and golf shafts, with fiber reinforced plastics.

REFERENCE SIGNS LIST

10: Core
11: Fusible part
11a: First fusible part
11b: Second fusible part
12: Outer skin
20: Prepreg preform
21: Prepreg sheet
30: Mold
31: Lower mold
32: Upper mold
40: Plate
50: FRP product

What is claimed is:

1. A method for producing a fiber reinforced plastic product, comprising:
    a core preparation step of preparing a core comprising a fusible part and an outer skin covering the fusible part;
    a molding step of disposing a prepreg preform inside a mold together with the core, and heating and pressurizing the prepreg preform in the mold to obtain a cured product; and
    a core removal step of removing a material of the fusible part from the cured product,
    in the molding step, at least a portion of the prepreg preform being pressurized by expansion of the core,
    wherein the fusible part comprises a first fusible part and a second fusible part having a melting temperature higher than that of the first fusible part,
    the material of the first fusible part and a material of the second fusible part are incompatible with each other, and
    in the molding step, the first fusible part melts partially or entirely, while the second fusible part does not melt partially or entirely.

2. The method according to claim 1,
wherein at least one of the first fusible part and the second fusible part comprises an organic substance.

3. The method according to claim 2,
wherein the first fusible part and the second fusible part each comprises an organic substance.

4. The method according to claim 3,
wherein the first fusible part and the second fusible part each comprises a wax.

5. The method according to claim 4,
wherein one of the first fusible part and the second fusible part comprises a wax containing a compound having a polar group as a main component, and the other comprises a wax containing a hydrocarbon as a main component.

6. The method according to claim 5,
wherein the first fusible part comprises the wax containing a hydrocarbon as a main component.

7. The method according to claim 6,
wherein the wax containing a hydrocarbon as a main component comprises a polyethylene wax.

8. The method according to claim 5,
wherein in the molding step, a plate is disposed inside the mold in addition to the prepreg preform and the core, and the plate is disposed between at least a portion of the prepreg preform and the core.

9. The method according to claim 5,
wherein a difference $T_M\text{-}T_{m1}$ between a mold temperature $T_M$ in the molding step and a melting temperature $T_{m1}$ of the first fusible part is 20° C. or more.

10. The method according to claim 5,
wherein a mold temperature $T_M$ in the molding step is 140° C. to 150° C., and a melting temperature $T_{m1}$ of the first fusible part is lower than 120° C.

11. The method according to claim 5,
wherein a difference $T_M\text{-}T_{m2}$ between a mold temperature $T_M$ in the molding step and a melting temperature $T_{m2}$ of the second fusible part is positive in value.

12. The method according to claim 5,
wherein a difference $T_{m2}\text{-}T_{m1}$ between a melting temperature $T_{m2}$ of the second fusible part and a melting temperature $T_{m1}$ of the first fusible part is 15° C. or more.

13. The method according to claim 12,
wherein a difference $T_M\text{-}T_{m2}$ between a mold temperature $T_M$ in the molding step and the melting temperature $T_{m2}$ of the second fusible part is 5° C. or less.

14. The method according to claim 5,
wherein a difference $T_{m2}\text{-}T_{m1}$ between a melting temperature $T_{m2}$ of the second fusible part and a melting temperature $T_{m1}$ of the first fusible part is 20° C. or more, and a difference $T_M\text{-}T_{m2}$ between a mold temperature $T_M$ in the molding step and the melting temperature $T_{m2}$ of the second fusible part is more than 5° C.

15. The method according to claim 5,
wherein a melting temperature $T_{m1}$ of the first fusible part is 50° C. or higher.

16. The method according to claim 5,
wherein a molding time in the molding step is 5 minutes or less.

17. The method according to claim 5,
wherein in the core preparation step, the outer skin is formed using an elastomer which includes a UV-curable elastomer.

18. The method according to claim 5,
wherein in the core removal step, the materials of the fusible part are removed by melting the materials.

19. The method according to claim 18,
wherein in the core removal step, the material of the first fusible part is removed at a temperature at which the material of the first fusible part fuses and the material of the second fusible part does not fuse, and then the material of the second fusible part is removed.

20. The method according to claim 18,
wherein after the core removal step, the material of the first fusible part and the material of the second fusible part are separated by utilizing a difference of the melting temperatures thereof.

21. The method according to claim 18,
wherein there is a specific gravity difference between a melt of the first fusible part and a melt of the second fusible part at the same temperature.

22. The method according to claim 21,
wherein in the core removal step or after the core removal step, the material of the first fusible part and the material of the second fusible part are separated by utilizing the specific gravity difference.

23. The method according to claim 4,
wherein one of the first fusible part and the second fusible part comprises a wax containing one or more compounds selected from a hydroxy fatty acid amide, a fatty acid amide, and a fatty acid ester, and the other comprises a wax containing a hydrocarbon as a main component.

* * * * *